(12) United States Patent
Li et al.

(10) Patent No.: US 11,026,269 B2
(45) Date of Patent: Jun. 1, 2021

(54) PREAMBLE CONFIGURATION METHOD, SENDING METHOD AND RELATED DEVICES ON AN UNLICENSED CARRIER

(71) Applicant: YULONG COMPUTER TELECOMMUNICATION SCIENTIFIC (SHENZHEN) CO., LTD., Shenzhen (CN)

(72) Inventors: Ming-Ju Li, Shenzhen (CN); Ya-Jun Zhu, Shenzhen (CN); Yun-Fei Zhang, Shenzhen (CN); Li Ma, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 272 days.

(21) Appl. No.: 16/090,246

(22) PCT Filed: Nov. 30, 2016

(86) PCT No.: PCT/CN2016/107848
§ 371 (c)(1),
(2) Date: Sep. 29, 2018

(87) PCT Pub. No.: WO2017/166841
PCT Pub. Date: Oct. 5, 2017

(65) Prior Publication Data
US 2019/0116614 A1 Apr. 18, 2019

(30) Foreign Application Priority Data

Apr. 1, 2016 (CN) .......................... 201610203647.3

(51) Int. Cl.
*H04W 74/08* (2009.01)
*H04W 72/04* (2009.01)
(Continued)

(52) U.S. Cl.
CPC ..... *H04W 74/085* (2013.01); *H04W 72/0413* (2013.01); *H04W 72/0446* (2013.01);
(Continued)

(58) Field of Classification Search
CPC ............... H04W 74/085; H04W 76/27; H04W 72/0413; H04W 72/0446
See application file for complete search history.

(56) References Cited

U.S. PATENT DOCUMENTS

| 2016/0050667 | A1* | 2/2016 | Papasakellariou | .... H04L 5/0053 370/329 |
| 2019/0124687 | A1* | 4/2019 | Yang | ....................... H04L 27/26 |

FOREIGN PATENT DOCUMENTS

| CN | 102271418 A | 12/2011 |
| CN | 104221454 A | 12/2014 |

(Continued)

OTHER PUBLICATIONS

Ericsson:"On Coordianted UL Channel Access for Enhanced LAA", 3GPP Draft;R1-161000, 3rd Generation Partnership Project (3GPP), Mobile Competence Centre ; 650, Route Des Lucioles; F-06921 Sophia-Antipolis Cedex; France , vol. RAN WG1, No. St. Julian's, Malta; Feb. 15, 2016-Feb. 19, 2016 Feb. 14, 2016 (Feb. 14, 2016), XP051054304, Retrieved from the Internet: URL:http://www.3gpp.org/ftp/Meetings_3GPP_SYNC/RAN1/Dots/, Section 2; p. 2.
(Continued)

*Primary Examiner* — Walli Z Butt
*Assistant Examiner* — Thad N Defauw
(74) *Attorney, Agent, or Firm* — ScienBiziP, P.C.

(57) ABSTRACT

The present disclosure provides a preamble configuration method on an unlicensed carrier, which includes: PRACH configuration information. The PRACH configuration information includes sub-frame location information, CCA interval location information for a channel idle estimation, a
(Continued)

channel detection mechanism, preamble format information and preamble sending location information; the sub-frame location information representing a sub-frame number of a sub-frame in which a preamble to be sent is located, the CCA interval location information representing a location on the sub-frame or on a previous sub-frame of the sub-frame, the CCA interval occupying at most N symbols at a head or at an end of the sub-frame, the preamble format information representing that the preamble is a format 0 preamble, the preamble sending location information representing a sending location of the format 0 preamble to be sent on the sub-frame. Control signaling carrying the PRACH configuration information to user equipment is sent.

11 Claims, 8 Drawing Sheets

(51) Int. Cl.
    *H04W 76/27*     (2018.01)
    *H04W 74/00*     (2009.01)
(52) U.S. Cl.
    CPC ....... *H04W 74/0833* (2013.01); *H04W 76/27* (2018.02); *H04W 74/006* (2013.01); *H04W 74/0808* (2013.01); *Y02D 30/70* (2020.08)

(56) References Cited

FOREIGN PATENT DOCUMENTS

| | | |
|---|---|---|
| CN | 105704834 A | 6/2016 |
| CN | 105898883 A | 8/2016 |
| WO | 2016028060 A1 | 2/2016 |

OTHER PUBLICATIONS

NTT Docomo et al:"Discussion on PRACH for eLAA UL",3GPP Draft; R1-160950 Discussion on PRACH for ELAA UL-Final,3rd Generation Partnership Project (3GPP),Mobile Competence Centre ;650, Route Des Lucioles ; F-06921 Sophia-Antipolis Cedex; France , vol. RAN WG1,No. St Julian's, Malta; Feb. 15, 2016-Feb. 19, 2016 Feb. 14, 2016 (Feb. 14, 2016), XPO51054258, Retrieved from the Internet: URL:http://www.3gpp.org/ftp/Meetings_3GPP_SYNC/RAN1/Docs, Section 3.1 and 3.2; p. 2.

Intel Corporation: "UL LBT for self-carrier scheduling",3GPP Draft; R1-155312, 3rd Generation Partnership Project (3GPP), Mobile Competence Centre ; 650, Route Des Lucioles ; F-06921 Sophia-Antipolis Cedex; France , vol. RAN WG1, No. MalmO, Sweden; Oct. 5, 2015-Oct. 9, 2015 1009 Oct. 4, 2015 (Oct. 4, 2015), XP051039626, Retrieved from the Internet: URL:http://www.3gpp.org/ftp/Meetings_3GPP_SYNC/RAN1/Docs/, Section 2, p. 1-p. 2.

* cited by examiner

PREAMBLE CONFIGURATION METHOD, SENDING METHOD AND RELATED DEVICES ON AN UNLICENSED CARRIER

CROSS-REFERENCE TO RELATED APPLICATIONS

This application claims priority of Chinese Patent Application No. 201610203647.3, entitled "PREAMBLE CONFIGURATION METHOD, SENDING METHOD, AND RELATED DEVICES ON AN UNLICENSED CARRIER," filed on Apr. 1, 2016 in the SIPO (State Intellectual Property Office of the People's Republic of China), the entire contents of which are incorporated by reference herein.

FIELD

The embodiments of the present disclosure relates to a technical field of communication, specifically a preamble configuration method, and a sending method, and related devices on an unlicensed carrier.

BACKGROUND

With a rapid growth of communications traffic, licensed frequency spectrums of the 3rd Generation Partnership Project (3GPP) appears increasingly inadequate to provide higher network capacities. In order to further improve utilization of frequency spectrum resources, the 3GPP is discussing how to use licensed frequency spectrums, such as 2.4 GHz and 5.8 GHz frequency bands, with a help of the licensed frequency spectrums. The unlicensed frequency spectrum is currently used mainly by a Wi-Fi system, a Bluetooth system, a Radar system, a medical system and other systems. Generally speaking, access technologies designed for the licensed frequency bands, such as the Long Term Evolution (LTE), are not suitable for use on the unlicensed frequency bands, because such the access technologies like the LTE require very high frequency spectrum efficiency and user experience optimization. However, Carrier Aggregation (CA) makes it possible to deploy the LTE to the licensed frequency bands. 3GPP proposes a concept of the LTE Assisted Access (LAA), for use on the unlicensed frequency spectrums with assistance of the LTE licensed frequency spectrums.

In the LTE network, good orthogonality ensures low interference levels, so uplink and downlink sending between base stations and users do not need to consider whether there are surrounding base stations or users. If the LTE is used on the unlicensed frequency spectrums without considering whether any other devices around it are using the licensed frequency spectrums, great interference is caused to Wi-Fi devices. Since the LTE transmits as long as a service exists, and there are no listening rules, then the Wi-Fi devices cannot transmit when the LTE have service sending. Only when the LTE service sending are completed, idle state of channels can be detected and the Wi-Fi devices can transmit.

So one of the main keys to LTE when using the licensed frequency bands is to ensure that the LAA can coexist with existing access technologies (such as the Wi-Fi) on a basis of fairness and friendship. Moreover, the traditional LTE system does not have a mechanism of Listen Before Talk (LBT) to avoid collision. For the LAA to coexist with the Wi-Fi better, the LTE requires the LBT mechanism. In this way, if the LTE detects a channel on the unlicensed frequency spectrum is busy, it cannot occupy the frequency band, and if the LTE detects that a channel on the unlicensed frequency spectrum is idle, it can occupy the frequency band. The current technology does not provide solutions on sending preamble on the unlicensed carrier, therefore, how to send the preamble on the unlicensed carrier for random access is focus of current research.

SUMMARY

Technical problems to be solved by embodiments of the present disclosure are providing a preamble configuration method and a preamble sending method on an unlicensed carrier, a base station and user equipment, to reduce access delay for user equipment.

In order to solve the above the technical problems, embodiments of the present disclosure provide a preamble configuration method on an unlicensed carrier, includes:

configuring Physical Random Access Channel (PRACH) configuration information by a base station, the PRACH configuration information includes sub-frame location information, Clear Channel Assessment (CCA) interval location information for a channel idle estimation, a channel detection mechanism, preamble format information and preamble sending location information; the sub-frame location information representing a sub-frame number of a sub-frame in which a preamble to be sent is located, the sub-frame being an uplink sub-frame, the CCA interval location information representing a location of a CCA interval on the sub-frame or on a previous sub-frame of the sub-frame, the CCA interval occupying at most N symbols at a head of the sub-frame, or at an end of a previous sub-frame of the sub-frame, the channel detection mechanism indicating user equipment whether to detect an idle state of the unlicensed carrier, the preamble format information representing that the preamble is a format 0 preamble, the preamble sending location information representing a sending location of the format 0 preamble to be sent on the sub-frame, the format 0 preamble occupying remaining symbols in the sub-frame;

sending control signaling carrying the PRACH configuration information to user equipment, the control signaling includes Radio Resource Control (RRC) signaling and/or Downlink Control Information (DCI) signaling.

Accordingly, embodiments of the present disclosure provide a preamble sending method on an unlicensed carrier include:

user equipment receives control signaling carrying Physical Random Access Channel (PRACH) configuration information sent by a base station by user equipment, the PRACH configuration information includes sub-frame location information, Clear Channel Assessment (CCA) interval location information for a channel idle estimation, a channel detection mechanism, preamble format information and preamble sending location information; the sub-frame location information representing a sub-frame number of a sub-frame in which a preamble to be sent is located, the sub-frame being an uplink sub-frame, the CCA interval location information representing a location of a CCA interval on the sub-frame or on a previous sub-frame of the sub-frame, the CCA interval occupying at most N symbols at a head of the sub-frame, or at an end of a previous sub-frame of the sub-frame, the channel detection mechanism indicating user equipment whether to detect an idle state of the unlicensed carrier, the preamble format information representing that the preamble is a format 0 preamble, the preamble sending location information representing a sending location of the format 0 preamble to be sent on the sub-frame, the format 0 preamble occupying remaining symbols in the sub-frame;

the user equipment determines a location of the CCA interval according to the sub-frame location information and the CCA interval location information and detects a state of the unlicensed carrier within the CCA interval according to the channel detection mechanism;

acquiring a preamble corresponding to the preamble format information when the unlicensed carrier is in an idle state, and sending the preamble to the base station according to an indication of the preamble sending location information.

BRIEF DESCRIPTION OF THE DRAWINGS

In order to describe the technical solutions in embodiments of the present disclosure or in the prior art more clearly, the following briefly introduces the accompanying drawings needed for describing the embodiments. The accompanying drawings in the following description show some embodiments of the present disclosure, and persons of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. The described embodiments are a part rather than all of the embodiments of the present disclosure. All other embodiments acquired by persons of ordinary skill in the art based on the embodiments of the present disclosure without creative efforts shall fall within the protection scope of the present disclosure.

Figure 1:
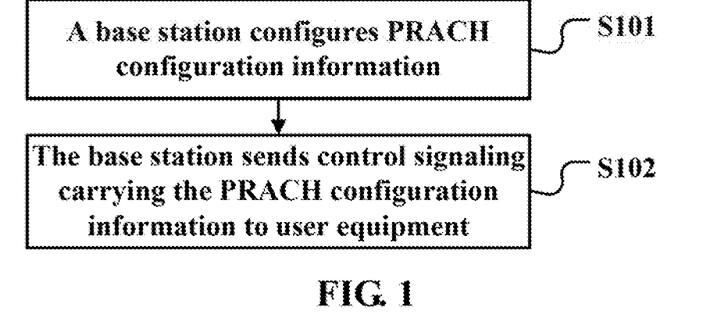
FIG. 1 is a flow diagram of a preamble configuration method on an unlicensed carrier provided in an embodiment of the present disclosure.

FIG. 1 shows a flow diagram of a preamble configuration method on an unlicensed carrier provided in an embodiment of the present disclosure, the method includes that:

Step 101, a base station configures Physical Random Access Channel (PRACH) configuration information.

Specifically, the PRACH configuration information is used to indicate relevant parameters of a preamble to be sent. The PRACH configuration information includes sub-frame location information, Clear Channel Assessment (CCA) interval location information for a channel idle estimation, a channel detection mechanism, preamble format information and preamble sending location information. The sub-frame location information represents a location of the sub-frame in which a preamble to be sent is located. The sub-frame location information can be represented by a wireless frame number and a sub-frame number. For example, a frame corresponding to the wireless frame number can be any, odd-numbered or even-numbered frame. The sub-frame number represents a location of the sub-frame in the wireless frame. One LTE wireless frame includes ten sub-frames, numbers being 0-9, the sub-frame location information is 0 indicates that a sub-frame in the LTE wireless frame whose sub-frame number is 0. In an embodiment of the present disclosure, a sub-frame type of the sub-frame corresponding to the sub-frame location information is specified as an uplink sub-frame. In one possible embodiment, the sub-frame location information can be represented not by the wireless frame number and the sub-frame number, but by a relative displacement of a current sub-frame. For example, a sub-frame used for sending the PRACH by Downlink Control Information (DCI) signaling is a displacement of the next three sub-frames relative to a sub-frame currently used for sending the DCI signaling. That is, if the sub-frame number used for sending the DCI signaling is N, then the sub-frame used for sending preamble is N+3. The CCA interval location information represents a location of a CCA interval of the preamble to be sent on the sub-frame. A starting location of the CCA interval overlaps with a starting location of a symbol. The CCA interval may occupy integer symbols or non-integer symbols on the sub-frames. That is, an ending location of the CCA interval can overlap with an ending location of the symbol, or cannot overlap with the ending location of the symbol. The CCA interval occupies at most N symbols at a head of the sub-frame, or at an end of a previous sub-frame of the sub-frame. N is 1 or 2. The CCA interval is used to evaluate a channel state of the unlicensed carrier. The channel detection mechanism indicates user equipment whether to detect an idle state of the unlicensed carrier. A detection method can be a one-shot CCA mechanism or Listen Before Talk (LBT) C4 mechanism based on random numbers. The preamble format information indicates a format of the preamble to be sent. The preamble to be sent configured by the base station of the embodiment is a format 0 preamble. The preamble sending location information represents a sending location of the preamble to be sent on the sub-frame. The format 0 preamble occupies remaining symbols in the sub-frame except for the CCA interval.

Specifically, the PRACH configuration information is used to represent relevant parameters of a preamble to be sent. The PRACH configuration information includes sub-frame location information, Clear Channel Assessment (CCA) interval location information for a channel idle estimation, a channel detection mechanism, preamble format information and preamble sending location information. The sub-frame location information represents a location of the sub-frame in which a preamble to be sent is located. The sub-frame location information can be represented either by a wireless frame number and a sub-frame number, or by a relative displacement of a current sub-frame. The sub-frame being an uplink sub-frame. The CCA interval location information represents a location of a CCA interval of the preamble to be sent on the sub-frame. A starting location of the CCA interval overlaps with a starting location of a symbol. The CCA interval may occupy integer symbols or non-integer symbols on the sub-frames. That is, an ending location of the CCA interval can overlap with an ending location of the symbol, or cannot overlap with the ending location of the symbol. The CCA interval occupies at most N symbols at a head of the sub-frame or at an end of a previous sub-frame of the sub-frame. N is 1 or 2. The CCA interval is used to evaluate a channel state of the unlicensed carrier. The channel detection mechanism indicates user equipment whether to detect an idle state of the unlicensed carrier. A detection method can be one-shot CCA mechanism or LBT C4 mechanism based on random numbers. The preamble format information represents a format of the preamble to be sent. The preamble to be sent configured by the base station of the embodiment is a format 0 preamble. The preamble sending location information represents a sending location of the preamble to be sent on the sub-frame. The format 0 preamble occupies remaining symbols in the sub-frame except for the CCA interval.

The user equipment determines whether the current carrier is an unlicensed carrier according to the carrier type information. If the current carrier is an unlicensed carrier, the user equipment detects a state of the unlicensed carrier within the CCA interval according to the channel detection mechanism.

Figure 2:
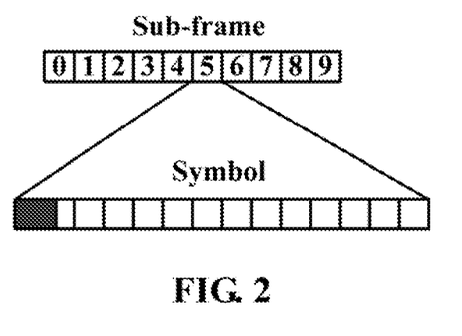
FIG. 2 is a schematic location diagram of a CCA interval configured on a sub-frame.

FIG. 2 shows an example embodiment of the related parameters in the PRACH configuration information configured by the base station. The sub-frame location information configured by the base station indicates that the wireless frame is the any frame, the sub-frame in the wireless frame is a sub-frame 5, and the sub-frame 5 is an upstream sub-frame including 14 symbols. When the base station configures the CCA interval location information, the CCA interval occupies symbols at a head of the sub-frame 5 (see black part in FIG. 2). A number of the symbol in the sub-frame 5 occupied by the CCA interval is not an integer, the number of the symbol between 1 and 2. A white part in the sub-frame 5 indicates the sending location of the preamble to be sent. The preamble to be sent is a format 0 preamble and occupies remaining symbols in the sub-frame 5 except for the CCA interval.

Figure 3:
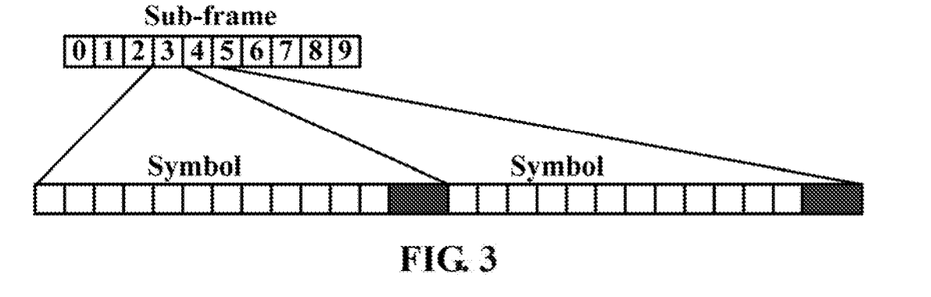
FIG. 3 is a schematic location diagram of a CCA interval configured on a sub-frame.

FIG. 3 shows an example embodiment of the related parameters in the PRACH configuration information configured by the base station. The sub-frame location information configured by the base station indicates that the wireless frame is the any frame, the sub-frame in the wireless frame is a sub-frame 4, and the sub-frame 4 is an upstream sub-frame including 14 symbols. When the base station configures the CCA interval location information, the CCA interval occupies 2 symbols at an end of a sub-frame 3 (see black part in FIG. 3). A white part in the sub-frame 4 indicates the sending location of the preamble to be sent. The preamble to be sent is a preamble in format 0 and occupies the remaining symbols in the sub-frame 4 except for the CCA interval. When the user detects that the channel on the unlicensed frequency spectrum in the CCA interval (2 symbols) at the end of the sub-frame 3 is idle, the preamble to be sent is sent in the first 12 symbols of the sub-frame 4.

Step 102, a base station sends control signaling carrying the PRACH configuration information to user equipment.

Specifically, the base station sends the control signaling carrying the PRACH configuration information to the user equipment, the control signaling includes Radio Resource Control (RRC) signaling and/or Digital Copyright Identifier (DCI) signaling. That is to say, the relevant parameters in the PRACH configuration information can be all carried by the RRC signaling, or all carried by the DCI signaling, or both. Some of the relevant parameters are carried in the RRC signaling, and the remaining relevant parameters are carried in the DCI signaling. The specific allocation can be made by the base station according to need, and the present disclosure is not restricted.

In a possible distribution solution of an embodiment of the present disclosure, the RRC signaling carries the CCA interval location information, the channel detection mechanism, the preamble format information and the preamble sending location information, but the DCI signaling carries the sub-frame location information.

Optionally, N is 1 or 2. That is, the CCA interval occupies up to 1 or 2 symbols at the head of the sub-frame corresponding to the sub-frame location information or at the end of the previous sub-frame of the sub-frame. The CCA interval occupies integer or non-integer symbols in the sub-frames. For example, when using the one-shot CCA, N is 1; when using the channel detection mechanism of the LBT C4, N is 2.

Optionally, the CCA interval overlaps with a CCA interval for sending Physical Uplink Shared Channel (PUSCH) configured by the base station for the user equipment.

Specifically, the CCA interval is the CCA interval of the format 0 preamble. A location of the CCA interval of the format 0 preamble is the same as that of a CCA interval of Physical Uplink Shared Channel/Physical Uplink Control Channel (PUSCH/PUCCH) and Channel Detects Reference Signals (SRS). That is, in the case of only sending the PUSCH/PUCCH and not sending the SRS, a sending location of the format 0 preamble is a sending location of the PUSCH/PUCCH, the CCA intervals of the two are the same. In the case of simultaneously sending the PUSCH/PUCCH and the SRS, a sending location of the format 0 preamble is a sending location of the PUSCH/PUCCH and the SRS, the CCA intervals of the two are the same. Wherein, the PUSCH/PUCCH indicates that users may only send the PUSCH, or may send the PUSCH and the PUCCH simultaneously on different Resource Blocks (RB). But in the case of simultaneously sending the PUSCH/PUCCH and the SRS, the SRS can be in front, and the PUSCH/PUCCH coming after. Alternatively, the PUSCH/PUCCH can be in front, and the SRS coming after. Here, the CCA intervals are the same, which is shown as follows: for example, a user 1 and a user 2, both of which detect a channel state within the CCA range, the user 1 sends the format 0 preamble after detecting that the channel is idle, the user 2 sends the PUSCH after detecting that the channel is idle.

From the above embodiments, it can be seen that the base station configures the relevant parameters of the preamble to be sent in the PRACH configuration information, to make the sending of preamble adapt to a dynamic change of the LAA frame structure type 3. Thus, random access can be realized by using a few of upstream sub-frames, and a delay of the random access can be reduced. The LAA frame structure type 3 is a frame structure used by the unlicensed frequency spectrums. See the frame structure type 3 in TS 36.211.

Figure 4:
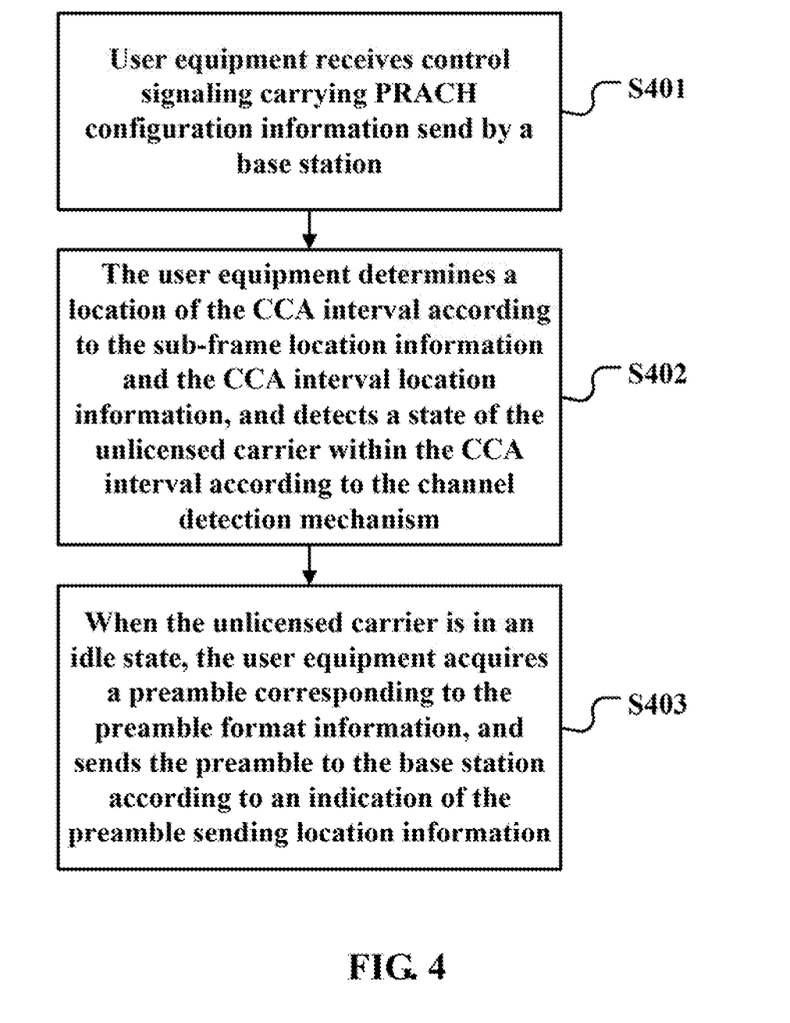
FIG. 4 is a schematic structural diagram of a preamble reception method on an unlicensed carrier provided in an embodiment of the present disclosure.

FIG. 4 shows a flow diagram of a preamble sending method on an unlicensed carrier provided in an embodiment of the present disclosure, the method includes that:

Step 401, user equipment receives control signaling carrying Physical Random Access Channel (PRACH) configuration information sent by a base station.

Specifically, the PRACH configuration information is used to represent relevant parameters of a preamble to be sent. The PRACH configuration information includes sub-frame location information, CCA interval location information, a channel detection mechanism, preamble format information and preamble sending location information. The sub-frame location information represents a location of the sub-frame in which a preamble to be sent is located. The sub-frame location information can be represented either by a wireless frame number and a sub-frame number, or by a relative displacement of a current sub-frame. The sub-frame being an uplink sub-frame. The CCA interval location information represents a location of a CCA interval of the preamble to be sent on the sub-frame. A starting location of the CCA interval overlaps with a starting location of a symbol. The CCA interval may occupy integer symbols or non-integer symbols on the sub-frames. That is, an ending location of the CCA interval can overlap with an ending location of the symbol, or cannot overlap with the ending location of the symbol. The CCA interval occupies at most N symbols at a head of the sub-frame or at an end of a previous sub-frame of the sub-frame. N is 1 or 2. The CCA interval is used to evaluate a channel state of the unlicensed carrier. The channel detection mechanism indicates user equipment whether to detect an idle state of the unlicensed carrier. A detection method can be one-shot CCA mechanism or LBT C4 mechanism based on random numbers. The preamble format information represents a format of the preamble to be sent. The preamble to be sent configured by the base station of the embodiment is a format 0 preamble. The preamble sending location information represents a sending location of the preamble to be sent on the sub-frame. The format 0 preamble occupies remaining symbols in the sub-frame except for the CCA interval.

Step 402, the user equipment determines a location of the CCA interval according to the sub-frame location information and the CCA interval location information, and detects a state of the unlicensed carrier within the CCA interval according to the channel detection mechanism.

Specifically, the user equipment determines a sub-frame in which a preamble to be sent is located according to the sub-frame location information, determines the location of the CCA interval on the sub-frame or on the previous sub-frame of the sub-frame according to the CCA interval location information, and detects the state of the unlicensed carrier within the CCA interval according to the channel detection mechanism after determining the location of the CCA interval. For example, when the channel detection mechanism is a one-shot CCA mechanism, a duration of the CCA interval is 25 us. If, within the CCA interval, a received power of the unlicensed carrier is less than a predetermine value is detected, this indicates that the unlicensed carrier within the CCA interval is idle and can transmit data on the unlicensed carrier. When the channel detection mechanism is an LBT C4 mechanism based on random numbers, taking a defer period (16 us+L×9 us) as a time unit firstly to detect the channel within the CCA interval. If, within the defer period, the received power of the unlicensed carrier continues to be less than the predetermined value is detected, than a random number N from 1 to q (q is a competition window value) is taken and the channel is detected at another time (for example, 9 us) as a time unit. If the received power of the unlicensed carrier continues to be less than the predetermined value is detected within the 9 us, than n minus 1, and the channel continues to be detected at 9 us as a time unit. If, within the 9 us, the received power of the unlicensed carrier does not continue to be less than the predetermined value is detected, the channel is determined as busy, than N minus. However, after detecting the channel is idle at defer period as a time unit, the channel will be detected at 9 us as a time unit. When the random number N is reduced to 0, this indicates that the unlicensed carrier is idle and can transmit data normally.

Step 403, when the unlicensed carrier is in an idle state, the user equipment acquires a preamble corresponding to the preamble format information, and sends the preamble to the base station according to an indication of the preamble sending location information. Wherein, the preamble format information includes the a preamble format number and a preamble index number.

Specifically, when the unlicensed carrier is in an idle state, the user equipment acquires the preamble corresponding to the preamble format information, since the preamble in the PRACH configuration information configured by the base station is a format 0 preamble, so that when the user equipment searches the preamble is a format 0 preamble, the preamble to the base station is sent according to the indication of the preamble sending location information.

Optionally, the control signaling includes carrier type information. Before the user equipment detects the state of the unlicensed carrier within the CCA interval according to the channel detection mechanism, the method further includes:

The user equipment determines whether the current carrier is an unlicensed carrier according to the carrier type information. If yes, the user equipment detects a state of the unlicensed carrier within the CCA interval according to the channel detection mechanism.

Specifically, the method of the user equipment determining the carrier type of the current carrier is: a determination as to whether the current carrier is an unlicensed carrier is made according to a frequency point of the current carrier, or the determination can be based on the carrier type according to a carrier type indicator. For example, the carrier type indicator is 1, which indicates that the carrier type is an unlicensed carrier. The carrier type indicator is 0, which indicates that the carrier type is a licensed carrier.

Optionally, the RRC signaling includes the carrier type information.

Specifically, the RRC signaling can be RRC signaling added by LAA Secondary cell (SCell).

Figure 5:
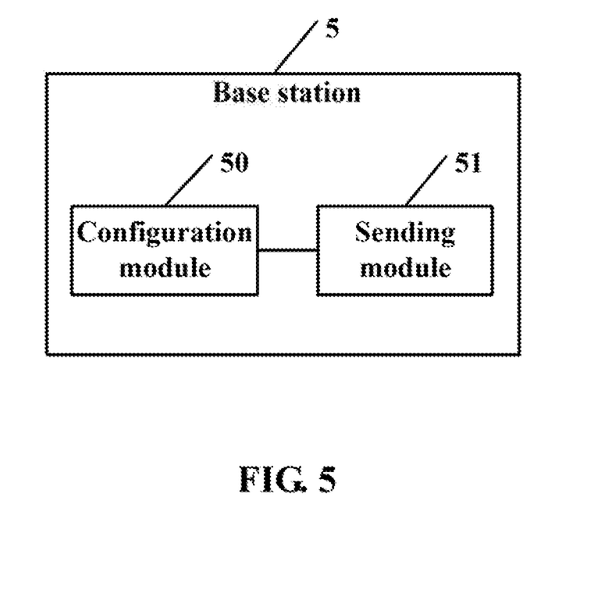
FIG. 5 is a structure diagram of a base station provided in an embodiment of the present disclosure.

FIG. 5 shows a structure diagram of a base station provided in an embodiment of the present disclosure. The base station of the embodiment of the present disclosure is used to execute the preamble configuration method on an unlicensed carrier in FIG. 1, the terms and procedures involved being those described in the embodiments of FIG. 1. The base station includes: a configuration module 50 and a sending module 51.

The configuration module 50, is configured to configure Physical Random Access Channel (PRACH) configuration information. The PRACH configuration information includes sub-frame location information, channel idle estimation CCA interval location information, a channel detection mechanism, preamble format information and preamble sending location information. The sub-frame location information represents a sub-frame number of a sub-frame in which a preamble to be sent is located. The sub-frame being an uplink sub-frame. The CCA interval location information represents a location of a CCA interval on the sub-frame or on a previous sub-frame of the sub-frame. The CCA interval occupies at most N symbols at a head of the sub-frame or at an end of a previous sub-frame of the sub-frame. The channel detection mechanism indicates user equipment whether to detect an idle state of the unlicensed carrier. The preamble format information represents that the preamble is a format 0 preamble. The preamble sending location information represents a sending location of the format 0 preamble to be sent on the sub-frame. The format 0 preamble occupies remaining symbols in the sub-frame.

The sending module 51, is configured to send control signaling carrying the PRACH configuration information to user equipment. The control signaling includes Radio Resource Control (RRC) signaling and/or Downlink Control Information (DCI) signaling.

Optionally, N is 1 or 2.

Optionally, the CCA interval overlaps with a CCA interval for sending Physical Uplink Shared Channel (PUSCH) configured by the base station for the user equipment.

The embodiment of the present disclosure and the method embodiment of FIG. 1 are based on the same concept, and the technical effects thereof are also the same. The processes in detail can refer to the description of the method embodiment 1, and are not repeated here.

Figure 6:
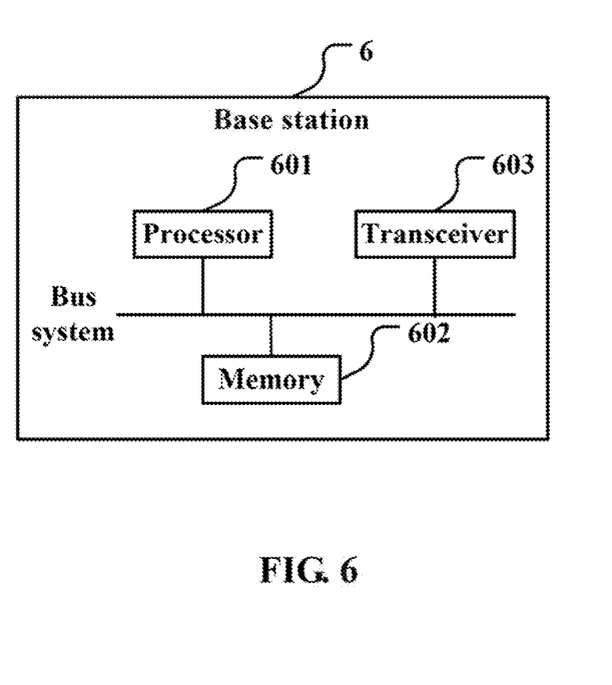
FIG. 6 is a structure diagram of a base station provided in another embodiment of the present disclosure.

FIG. 6 shows a structure diagram of a base station of another embodiment in the present disclosure. In the embodiment of the present disclosure, the base station includes a processor 601, a memory 602 and a transceiver 603. The transceiver 603 is used to send and receive data from external devices. A number of the processor 601 of the base station 6 may be one or more than one. In some embodiments of the present disclosure, the processor 601, the memory 602 and the transceiver 603 can be connected through a bus system or in other ways. The base station 6 can be used to execute the method shown in FIG. 1. For the meaning of the terms involved in the embodiment and examples may refer to the corresponding embodiments in FIG. 1. Those are not repeated here.

In which, the memory 602 stores program codes. The processor 601 is used to invoke the program codes stored in the memory 602 to execute the following operations:

configure Physical Random Access Channel (PRACH) configuration information. The PRACH configuration information includes sub-frame location information, channel idle estimation CCA interval location information, a channel detection mechanism, preamble format information and preamble sending location information. The sub-frame location information represents a sub-frame number of a sub-frame in which a preamble to be sent is located. The sub-frame being an uplink sub-frame. The CCA interval location information represents a location of a CCA interval on the sub-frame or on a previous sub-frame of the sub-frame. The CCA interval occupies at most N symbols at a head of the sub-frame, or at an end of a previous sub-frame of the sub-frame. The channel detection mechanism indicates user equipment whether to detect an idle state of the unlicensed carrier. The preamble format information represents that the preamble is a format 0 preamble. The preamble sending location information represents a sending location of the format 0 preamble to be sent on the sub-frame. The format 0 preamble occupies remaining symbols in the sub-frame.

send control signaling carrying the PRACH configuration information to user equipment. The control signaling includes Radio Resource Control (RRC) signaling and/or Downlink Control Information (DCI) signaling.

In one possible embodiment of the present disclosure, N is 1 or 2.

In one possible embodiment of the present disclosure, the CCA interval overlaps with a CCA interval for sending Physical Uplink Shared Channel (PUSCH) configured by the base station for the user equipment.

Figure 7:
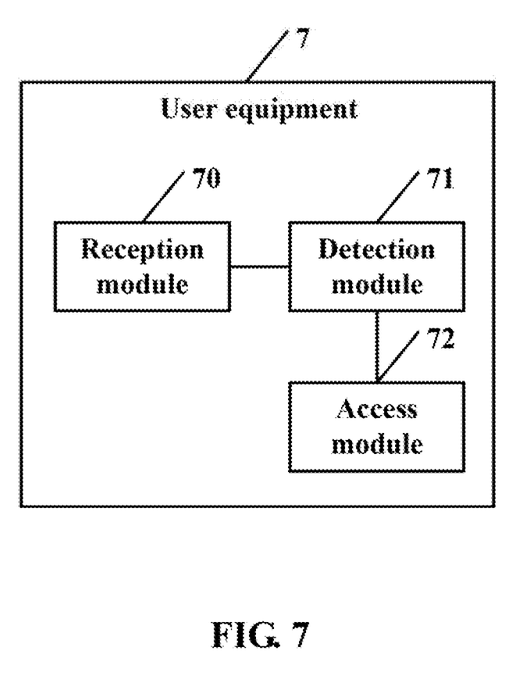
FIG. 7 is a structure diagram of user equipment provided in an embodiment of the present disclosure.

FIG. 7 shows a structure diagram of user equipment provided in an embodiment of the present disclosure. The user equipment of the embodiment of the present disclosure is used to execute the preamble reception method on an unlicensed carrier as in FIG. 2, the terms and procedures involved are described in the embodiments of FIG. 2. The user equipment includes: a reception module 70, a detection module 71 and an access module 72.

The reception module 70, is configured to receive control signaling carrying PRACH configuration information sent by a base station. The control signaling includes Radio Resource Control (RRC) signaling and/or Downlink Control Information (DCI) signaling. The PRACH configuration information includes sub-frame location information, channel idle estimation CCA interval location information, a channel detection mechanism, preamble format information and preamble sending location information. The sub-frame location information represents a sub-frame number of a sub-frame in which a preamble to be sent is located. The sub-frame being an uplink sub-frame. The CCA interval location information represents a location of a CCA interval on the sub-frame or on a previous sub-frame of the sub-frame. The CCA interval occupies at most N symbols at a head of the sub-frame, or at an end of a previous sub-frame of the sub-frame. The channel detection mechanism indicates user equipment whether to detect an idle state of the unlicensed carrier. The preamble format information represents that the preamble is a format 0 preamble. The preamble sending location information represents a sending location of the format 0 preamble to be sent on the sub-frame. The format 0 preamble occupies remaining symbols in the sub-frame.

The detection module 71, is configured to determine a location of the CCA interval according to the sub-frame location information and the CCA interval location information, and detect a state of the unlicensed carrier within the CCA interval according to the channel detection mechanism.

The access module 72, is configured to acquire a preamble corresponding to the preamble format information when the unlicensed carrier is in an idle state, and send the preamble to the base station according to an indication of the preamble sending location information.

Optionally, the user equipment 7 also includes:
a determination module, is configured to determinate whether a current carrier is an unlicensed carrier according to carrier type information carried in the control signaling. If the current carrier is an unlicensed carrier, it activates the detection module to start working.

Optionally, the RRC signaling includes the carrier type information.

The embodiment of the present disclosure and the method embodiment of FIG. 2 are based on the same concept, and the technical effects thereof are also the same. The processes in detail can refer to the description of the method embodiment 2, and are not repeated here.

Figure 8:
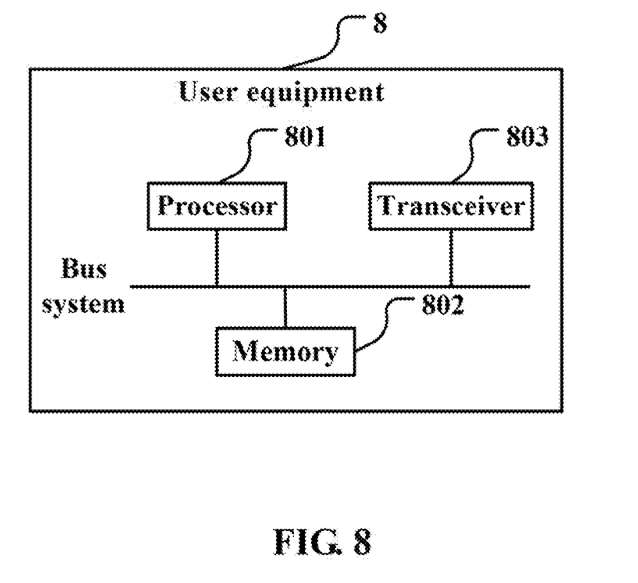
FIG. 8 is a structure diagram of user equipment provided in another embodiment of the present disclosure.

FIG. 8 shows a structure diagram of user equipment of another embodiment in the present disclosure. In the embodiment of the present disclosure, the user equipment includes a processor 801, a memory 802 and a transceiver 803. The transceiver 803 is used to send and receive data from external devices. A number of the processor 801 of the user equipment 8 may be one or more than one. In some embodiments of the present disclosure, the processor 801, the memory 802 and the transceiver 803 can be connected through a bus system or in other ways. The user equipment 8 can be used to execute the method shown in FIG. 2. For the meaning of the terms involved in the embodiment and examples may refer to the corresponding embodiments in FIG. 2. Those are not repeated here.

In which, the memory 802 stores program codes. The processor 801 is used to invoke the program codes stored in the memory 802 to execute the following operations:

receive control signaling carrying PRACH configuration information sent by a base station. The control signaling includes Radio Resource Control (RRC) signaling and/or Downlink Control Information (DCI) signaling. The PRACH configuration information includes sub-frame location information, channel idle estimation CCA interval location information, a channel detection mechanism, preamble format information and preamble sending location information. The sub-frame location information represents a sub-frame number of a sub-frame in which a preamble to be sent is located. The sub-frame being an uplink sub-frame. The CCA interval location information represents a location of a CCA interval on the sub-frame or on a previous sub-frame of the sub-frame. The CCA interval occupies at most N symbols at a head of the sub-frame, or at an end of a previous sub-frame of the sub-frame. The channel detection mechanism indicates user equipment whether to detect an idle state of the unlicensed carrier. The preamble format information represents that the preamble is a format 0 preamble. The preamble sending location information represents a sending location of the format 0 preamble to be sent on the sub-frame. The format 0 preamble occupies remaining symbols in the sub-frame.

determine a location of the CCA interval according to the sub-frame location information and the CCA interval location information, and detect a state of the unlicensed carrier within the CCA interval according to the channel detection mechanism.

acquire a preamble corresponding to the preamble format information when the unlicensed carrier is in an idle state, and send the preamble to the base station according to an indication of the preamble sending location information.

In one possible embodiment of the present disclosure, before determining the location of the CCA interval according to the sub-frame location information and the CCA interval location information, and detecting the state of the unlicensed carrier within the CCA interval according to the channel detection mechanism, the processor 801 also includes:

determinate whether a current carrier is an unlicensed carrier according to carrier type information carried in the control signaling. If the current carrier is an unlicensed carrier, determining the location of the CCA interval according to the sub-frame location information and the CCA interval location information, and detecting the state of the unlicensed carrier within the CCA interval according to the channel detection mechanism.

In one possible embodiment of the present disclosure, the RRC signaling includes the carrier type information.

The user equipment provided by the embodiments of the present disclosure includes, but is not limited to, user equipment equipped with iOS®, Android®, Microsoft® or other operating system, such as those in a mobile phone. Other user equipment may also be used, such as a laptop or a tablet or a desktop computer with a touch-sensitive surface (e.g., a touch screen display and/or a touch pad).

User equipment including a display and a touch-sensitive surface is hereinafter described. It should be understood, however, that the user equipment can include one or more other physical user interface devices, such as a physical keyboard, a mouse, and/or a joystick.

User equipment generally supports a variety of applications, such as one or more of a drawing application, a rendering application, a word processing application, a web page creation application, a disc editing application, a spreadsheet application, a game application, a phone application, a video conferencing application, an email application, an instant messaging application, a workout support application, a photo management application, a digital camera application, a digital video camera application, a web browsing application, a digital music player application, and/or a digital video player application.

Applications that can be executed on the user equipment can use at least one shared physical user interface device, such as a touch-sensitive surface. One or more functions of the touch-sensitive surface and corresponding information displayed on the terminal may be adjusted and/or changed from one application to a next application, and/or adjusted and/or varied within applications. In this way, the shared physical architecture of the user equipment, such as a touch-sensitive surface, can support applications with a user interface that is intuitive to the user.

Persons of ordinary skill in the art can understand that all or part of the processes of the above embodiments may be implemented by executing a computer program by related hardware. The program may be stored in a computer readable storage medium. The program, when executed, may implement the flow of the method embodiments as described above. The storage medium may be a magnetic disk, an optical disk, a read-only memory (ROM), or a random access memory (RAM).

The above mentioned descriptions are merely preferred embodiments of the present disclosure, and certainly, should not limit the scope of the present disclosure. Thus, any modification and equivalent according to the claims of the present disclosure, should be still within the scope of the present disclosure.

We claim:

1. A preamble configuration method on an unlicensed carrier, executed in a base station, the method comprising:

configuring Physical Random Access Channel (PRACH) configuration information, the PRACH configuration information comprising sub-frame location information, Clear Channel Assessment (CCA) interval location information for a channel idle estimation, a channel detection mechanism, preamble format information and preamble sending location information; the sub-frame location information representing a sub-frame number of a sub-frame in which a preamble to be sent is located, the sub-frame being an uplink sub-frame, the CCA interval location information representing a location of a CCA interval on the sub-frame or on a previous sub-frame of the sub-frame, the CCA interval occupying at most N symbols at a head of the sub-frame or at an end of a previous sub-frame of the sub-frame, the channel detection mechanism indicating user equipment whether to detect an idle state of the unlicensed carrier, the preamble format information representing that the preamble is a format 0 preamble, the preamble sending location information representing a sending location of the format 0 preamble to be sent on the sub-frame, the format 0 preamble occupying remaining symbols in the sub-frame; and sending control signaling carrying the PRACH configuration information to the user equipment, the control signaling comprises Radio Resource Control (RRC) signaling.

2. The preamble configuration method of claim 1, wherein N is 1 or 2, the RRC signaling comprises the carrier type information which is used by the user equipment to determine whether a current carrier is an unlicensed carrier according to the carrier type information.

3. The preamble configuration method of claim 2, wherein the CCA interval overlaps with a CCA interval for sending Physical Uplink Shared Channel (PUSCH) configured by the base station for the user equipment.

4. The preamble configuration method of claim 2, wherein the CCA interval overlaps with a CCA interval for sending Physical Uplink Shared Channel (PUSCH) configured by the base station for the user equipment.

5. A preamble sending method on an unlicensed carrier, executed in user equipment, the method comprising:
receiving control signaling carrying Physical Random Access Channel (PRACH) configuration information sent by a base station, the control signaling includes Radio Resource Control (RRC) signaling, the PRACH configuration information comprising sub-frame location information, Clear Channel Assessment (CCA) interval location information for a channel idle estimation, a channel detection mechanism, preamble format information and preamble sending location information; the sub-frame location information representing a sub-frame number of a sub-frame in which a preamble to be sent is located, the sub-frame being an uplink sub-frame, the CCA interval location information representing a location of a CCA interval on the sub-frame or on a previous sub-frame of the sub-frame, the CCA interval occupying at most N symbols at a head of the sub-frame or at an end of a previous sub-frame of the sub-frame, the channel detection mechanism indicating user equipment whether to detect an idle state of the unlicensed carrier, the preamble format information representing that the preamble is a format 0 preamble, the preamble sending location information representing a sending location of the format 0 preamble to be sent on the sub-frame, the format 0 preamble occupying remaining symbols in the sub-frame;
determining a location of the CCA interval according to the sub-frame location information and the CCA interval location information, and detecting a state of the unlicensed carrier within the CCA interval according to the channel detection mechanism; and
acquiring a preamble corresponding to the preamble format information when the unlicensed carrier is in an idle state; and sending the preamble to the base station according to an indication of the preamble sending location information.

6. The preamble sending method of claim 5, before determining the location of the CCA interval according to the sub-frame location information and the CCA interval location information, and detecting the state of the unlicensed carrier within the CCA interval according to the channel detection mechanism, further comprising:
determining whether a current carrier is an unlicensed carrier according to carrier type information carried in the control signaling;
if the current carrier is an unlicensed carrier, determining the location of the CCA interval according to the sub-frame location information and the CCA interval location information, and detecting the state of the unlicensed carrier within the CCA interval according to the channel detection mechanism.

7. The preamble sending method of claim 6, wherein the RRC signaling comprises the carrier type information.

8. User equipment, comprising:
at least one processor; and
a storage device storing a plurality of instructions, which when executed by the at least one processor, causes the at least one processor to:
receive control signaling carrying Physical Random Access Channel (PRACH) configuration information sent by a base station, the control signaling comprises Radio Resource Control (RRC) signaling, the PRACH configuration information comprises sub-frame location information, Clear Channel Assessment (CCA) interval location information for a channel idle estimation, a channel detection mechanism, preamble format information and preamble sending location information; the sub-frame location information representing a sub-frame number of a sub-frame in which a preamble to be sent is located, the sub-frame being an uplink sub-frame, the CCA interval location information representing a location of a CCA interval on the sub-frame or on a previous sub-frame of the sub-frame, the CCA interval occupying at most N symbols at a head of the sub-frame, or at an end of a previous sub-frame of the sub-frame, the channel detection mechanism indicating user equipment whether to detect an idle state of the unlicensed carrier, the preamble format information representing that the preamble is a format 0 preamble, the preamble sending location information representing a sending location of the format 0 preamble to be sent on the sub-frame, the format 0 preamble occupying remaining symbols in the sub-frame;
determine a location of the CCA interval according to the sub-frame location information and the CCA interval location information by the user equipment, and detecting a state of the unlicensed carrier within the CCA interval according to the channel detection mechanism;
acquire a preamble corresponding to the preamble format information when the unlicensed carrier is in an idle state; and sending the preamble to the base station according to an indication of the preamble sending location information.

9. The user equipment of claim 8, wherein the plurality of instructions, when executed by the at least one processor, further causes the at least one processor to:
determine whether a current carrier is an unlicensed carrier according to carrier type information carried in the control signaling;
if the current carrier is an unlicensed carrier, indicating the at least one processor to start working.

10. The user equipment of claim 8, wherein the RRC signaling comprises carrier type information.

11. The user equipment of claim 8, wherein N is 1 or 2.

* * * * *